Nov 1, 1949.  A. ALLEN  2,486,625

ELECTRIC STRAIN MEASURING DEVICE

Filed June 13, 1945

INVENTOR.
Albert Allen
BY
Blair, Curtis + Hayward
ATTORNEYS

Patented Nov. 1, 1949

2,486,625

UNITED STATES PATENT OFFICE 2,486,625

ELECTRIC STRAIN MEASURING DEVICE

Albert Allen, Sharon, Mass., assignor to The Foxboro Company, Foxboro, Mass., a corporation of Massachusetts Application June 13, 1945, Serial No. 599,201

1 Claim. (Cl. 201—63)

This invention relates to means and method for use in measuring, indicating and recording the greatest or "peak" strain undergone by a structural or other member subjected to stress. In the illustrative embodiment herein disclosed a preferred means for use in practicing the method takes the form of an electrical strain-sensitive wire gauge device so constructed as to retain the condition imposed upon it by the maximum stress to which it has been subjected, so that after relief of the stress the device may still serve to produce an indication or record of its maximum.

Among the practical uses of the invention is that of determining the peak strains sustained by structural members of aircraft during actual flight. Neither ordinary strain gauges nor ordinary strain-determining procedures are suitable for such purposes. In ordinary strain gauges the condition of strain alters in accordance both with the increase and decrease of stress upon them, and a record or indication of their peak strains could be obtained only by carrying in the plane an indicating or recording instrument for each gauge together with its source of electric current, its wire connections, etc., and continuously measuring the varying degree of strain while the strain was being imposed. But in employing such peak strain-determining means and method as herein disclosed the strain gauge devices may be secured to as many plane parts as desired, no wiring or instruments being attached; and when the plane returns from flight the gauges may be connected with indicating or recording instruments to show the peak strain which each gauge has undergone. In this manner the peak strains upon many parts of the plane may be determined by a single flight, for as many gauge devices may be attached as there are parts whereof the strain is to be measured.

In constructing devices embodying or for use in practicing the invention the usual well-known fine wire strain gauge may be taken as a basis. Such strain gauges are disclosed in United States Letters Patent 2,292,549, issued August 11, 1942, to Edward E. Simmons, Jr., and comprise a filament of very fine metallic wire of proper electrical strain characteristics woven into a suitable mat or embedded in a layer of adhesive insulating material spread upon a membrane such as a piece of thin paper. Such strain gauges are well known in the art and do not require further description.

In the embodiment of apparatus herein illustrated a standard type of paper-mounted strain gauge 2 is firmly secured upon the surface of a soft cast lead member 1. When the lead member, carrying its attached gauge, is fixed to the structural member 5, and that member is strained, lead member 1 is correspondingly strained together with the gauge 2. Cast lead has a relatively low degree of resilience and when the lead member has been strained beyond this low elastic limit it will not return to its former condition when the strain is relieved, but will maintain, in substantial measure, the deformation produced by the maximum strain. Consequently the strain gauge 2, fixed to the lead member, will also be held in its corresponding condition of maximum strain—the resistance of the lead member to retrogression being as strong as or stronger than the tendency of the strained gauge to return to its former state. In other words, if the strain involves an elongation, the lead member will stretch an amount equivalent to the greatest or peak strain set up in the test member 5. This peak strain can then be measured by a conventional indicator some time after the occurrence and at some convenient place, eliminating the necessity of having the cumbersome measuring equipment on hand and continually taking measurements. For accuracy it is only necessary to take into account and correct for the small factor of resilience inherent in the lead.

Figure 1:
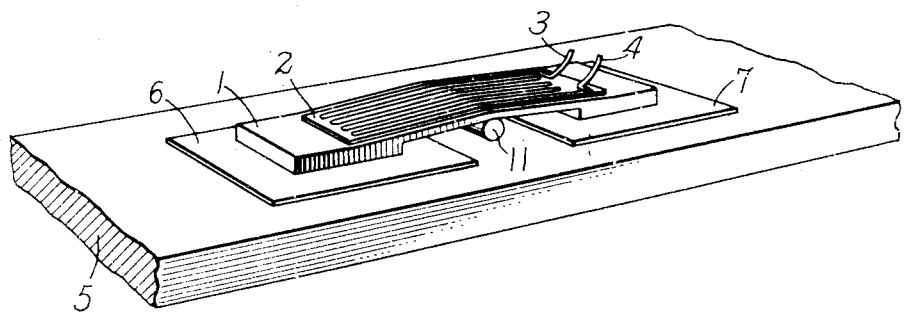
Figure 1 is a perspective view, somewhat enlarged, of one embodiment of the invention so far as it relates to apparatus.

Experience indicates the necessity of forming the member 1 of lead so "dead soft" that it has a negligible amount of internal initial strains. To accomplish this the lead member has been die cast from pure lead, and when used in measuring elongative strain, has been preferably so shaped that, when applied, it forms a bridge secured at each end to the work to be tested, but free in the middle. The thin mid-section of the lead member 1 (as shown in Figure 1) may be about $\frac{1}{32}$ of an inch in thickness; the end portions about $\frac{5}{64}$ of an inch thick; the overall length may be about 2 inches; and the width about $\frac{1}{2}$ of an inch. It may be well to provide a central pier, such as the transverse piece 11, of such dimensions as to hold the mid-section of the lead member in a somewhat arcuate position. In such a construction the thinner portion of the lead member 1 does most of the stretching as the member 5 is strained, and the gauge 2, secured throughout most of its length to this thinner portion, stretches with it. Furthermore, as the strain is removed and the ends of the lead member tend to be moved back toward each other, there will be no resultant tendency to compress the thin mid-section, thus reducing the strain of the wire; for the thin mid-section, already slightly bowed, will bow further instead of undergoing compression.

The paper-mounted gauge 2 may be satisfactorily cemented upon lead member 1 by means of "Duco cement." The lead member 1 may then be secured to the structural member 5 by first cementing paper (as wafers 6 and 7 in Figure 1) to member 5 by "Duco cement," and then cementing the lead member to the paper. Thus the cement is allowed to dry and harden, the porosity of the paper between member 1 and member 5 permitting the entry of enough air for this purpose.

Figure 2:
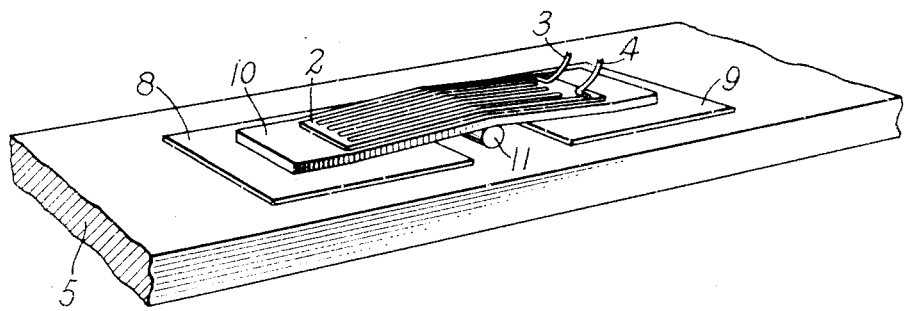
Figure 2 shows a modification.

The bridge effect of the gauge device may be produced as shown in Figure 2, wherein the lead member 10 is shown as a strip of uniform thickness, cemented at its ends upon paper tabs 8 and 9, these tabs being cemented to member 5 in such spaced relation to each other that lead member 10 forms a bridge between them. The spacing of the paper tabs is preferably such that the space is bridged by the gauge 2, thus subjecting the gauge to the full effect of strain between the ends of the bridge.

It is unnecessary, for purposes of the present invention, to illustrate any source of electrical power to produce a flow of electric current through the strain gauge filament or to illustrate any of the indicating or recording instruments which may be used to indicate or record the variations in resistance resulting from strain. Such instruments and their use with strain gauges are well known in the art. Consequently the terminal strain gauge wires 3 and 4 are merely shown as available for connection to such instruments in any usual manner.

As many possible embodiments may be made of the invention in so far as it relates to apparatus for use in determining peak strain, and as variations are possible in practice of the invention in so far as it relates to method for determining peak strain, it is to be understood that all matters hereinbefore set forth or shown in the accompanying drawings are to be interpreted as illustrative and not in a limiting sense.

I claim:

A gauge device for use in determining the peak strain of a member subjected to stress, comprising, in combination, a continuous filament of extensible strain sensitive electrical conducting material whose electrical resistance varies in accordance with its extension, a bridge member of low resilience and high ductility to which said filament is atached, said bridge member having a cross section tapering toward its center to form thereat a thin portion and being adapted to be secured at its ends to said stressed member, and a fulcrum element interposed between the center portion of said bridge and said stressed member to impart a bend to said bridge near its thin center portion, whereby elongative strain of said member at a point or points within the span of said bridge causes corresponding elongation of said bridge and said filament, the bridge, thus elongated, assuming a posture serving to maintain said filament substantially in its condition of maximum elongation.

ALBERT ALLEN.

REFERENCES CITED

The following references are of record in the file of this patent:

UNITED STATES PATENTS

| Number | Name | Date |
|---|---|---|
| 464,766 | Wendler | Dec. 8, 1891 |
| 1,809,925 | Edwards | June 16, 1931 |
| 2,340,146 | Ruge | Jan. 25, 1944 |
| 2,403,951 | Ruge | July 16, 1946 |